(12) United States Patent
McLaughlin et al.

(10) Patent No.: US 6,243,007 B1
(45) Date of Patent: Jun. 5, 2001

(54) TIRE CONDITION MONITORING SYSTEM

(76) Inventors: John T. McLaughlin, 1528 Brookhollow Dr., Suite 59, Santa Ana, CA (US) 92705; Joseph W. Rovan, 2740 San Carlos La., Costa Mesa, CA (US) 92625

(*) Notice: Subject to any disclaimer, the term of this patent is extended or adjusted under 35 U.S.C. 154(b) by 0 days.

(21) Appl. No.: 09/452,518

(22) Filed: Dec. 1, 1999

(51) Int. Cl.$^7$ .................................................. B60C 23/00
(52) U.S. Cl. ........................ 340/447; 340/442; 340/445; 73/146.5
(58) Field of Search .................................. 340/442, 445, 340/447; 73/146.5

(56) References Cited

U.S. PATENT DOCUMENTS

| | | | |
|---|---|---|---|
| 4,334,215 | 6/1982 | Frazier et al. | 340/539 |
| 4,978,941 | 12/1990 | Brown | 340/447 |
| 5,400,649 | 3/1995 | Bartscher et al. | 73/146.5 |
| 5,463,374 | * 10/1995 | Mendez et al. | 340/442 |
| 5,473,938 | 12/1995 | Handfield et al. | 73/146.5 |
| 5,516,379 | 5/1996 | Schultz | 152/415 |
| 5,573,610 | 11/1996 | Koch et al. | 152/152.1 |
| 5,661,651 | 8/1997 | Geschke et al. | 701/88 |
| 5,663,496 | 9/1997 | Handfield et al. | 73/146.5 |
| 5,728,933 | 3/1998 | Schultz et al. | 73/146.5 |
| 5,748,076 | 5/1998 | Horie | 340/442 |
| 5,783,992 | 7/1998 | Eberwine et al. | 340/445 |
| 5,945,908 | 8/1999 | Nowicki et al. | 340/447 |

* cited by examiner

Primary Examiner—Daryl Pope
(74) Attorney, Agent, or Firm—Kelly Bauersfeld Lowry & Kelley, LLP

(57) ABSTRACT

A tire condition monitoring system includes a monitoring device securely positioned within a tire and in electronic communication with a receiver and a cab mounted visual display. In one embodiment, the monitoring device includes a battery, an inductive pick-up coil, pressure and/or temperature sensors, a microprocessor, and a data transmitter. Each monitoring device has a unique multi-bit identification code. The monitoring device is shipped in an energy conserving dormant state until activated either by pressurization of the tire or by use of a portable hand-held wand transmitter. The hand-held transmitter assigns the monitoring device a relative tire position. After activation, the monitoring device periodically senses tire condition. This information is stored and compared to preset parameters and the last stored tire condition information. The tire information is periodically sent to the receiver and visually displayed. If the sensed tire condition information deviates from preset parameters, the sensed tire information is immediately telemetered to the receiver and an alarm is activated. During prolonged periods of vehicle and tire inactivity, the monitoring device measures and transmits less frequently to preserve power. The monitoring device automatically reactivates upon vehicle reactivity. In another embodiment, a monitoring device having a mechanical air pressure sensor, a motion detector, a battery and a transmitter is positioned within the tire. Once the tire is traveling at a predetermined velocity, power is supplied to the mechanical air pressure sensor. When the tire pressure drops below a predetermined level, the mechanical air pressure sensor provides power to the transmitter which generates a signal to a receiver and cab mounted alarm.

34 Claims, 19 Drawing Sheets

TIRE CONDITION MONITORING SYSTEM

BACKGROUND OF THE INVENTION

The present invention pertains to a tire monitoring system. More particularly, the present invention relates to a tire monitoring system which monitors tire engineering conditions, including pressure and temperature, using a monitoring device which is generally installed on the interior portion of a pneumatic tire or tire rim and in electronic communication with a receiver.

The need to maintain tires at the correct pressure level to eliminate driving on under-inflated tires is fundamental in preventing undue tread wear, increased fuel consumption and flat tire accidents. If the average passenger car tire pressure decreases from 32 p.s.i. to 25 p.s.i., the life of the tire is reduced by 20% due to uneven tread wear and fuel consumption increases by up to 10%. A vehicle's handling and braking are also adversely affected by tires having low air pressure. The U.S. National Highway Traffic and Safety Administration has reported that almost half of the tires on the road are under-inflated and may account for as many as 250,000 annual accidents. It has also been estimated that over five million gallons of gasoline are wasted each year due to tire under-inflation.

Tires known as "run-flat" tires have recently been developed which have reinforced side walls so that the tire can be driven on for a certain number of miles with little or no physical manifestation even though the tire is completely deflated. Without a tire monitoring system, the driver will not be aware that he or she has a flat tire and may destroy the tire before having it repaired or replaced.

An operational and practical design for remote tire pressure and/or temperature measuring devices has been attempted for many years. Unfortunately, none of these devices has achieved acceptance for many reasons including the unreliability and fragility of the components. Not until the invention of miniature solid state sensors and microprocessors has any degree of success been achieved. However, these systems can also be unreliable and very expensive.

Many modern tire monitoring systems consist of pressure and temperature transducers as well as a transmitter. Power is supplied by utilizing a battery, inductive coils or piezoelectric power. Although there are a myriad of combinations of these components, considerable effort is required to design a system that is reliable, easily used by non-technical personnel, and cost effective.

Accordingly, what is needed is a tire pressure monitoring system utilizing modern electronics which are internally mounted within a tire. What is further needed is a tire pressure monitoring system which is reliable, cost-effective and easily used by non-technical personnel. The present invention fulfills these needs and provides other related advantages.

SUMMARY OF THE INVENTION

A tire condition monitoring system is provided which informs the driver of the condition, including air pressure, of one or more of the tires so that the driver is alerted when a tire is deflated. Other engineering data, including tire temperature, can also be relayed to the driver or maintenance personnel. The system is cost-effective and reliable and can be used by non-technical personnel for the life of the tire.

In accordance with the invention, a tire condition monitoring device having a unique identification code is positioned within a pneumatic tire. The tire condition monitoring device includes a battery, at least one sensor in electrical circuit with the battery, a programmable microprocessor in circuit with the battery, a transmitter in circuit with the battery and a pick-up coil in electrical circuit with the microprocessor. The sensors include a pressure sensor and a temperature sensor. The transmitter includes a SAW filter for pulse modulated transmissions. The unique identification code comprises a multiple bit code which specifically identifies the device. The monitoring device is securely attached to either a rim for the tire or an inner surface of the tire itself.

The tire condition monitoring device is shipped in a dormant mode. After installation, the monitoring device can be activated and assigned a tire location by pressurizing each tire to a predetermined level to activate the monitoring device from a dormant state to an operational state. Alternatively, the monitoring device is activated and assigned a tire location by use of a portable hand-held wand transmitter. This is accomplished by holding the hand-held transmitter close to the tire and actuating a switch of a keypad on the hand-held transmitter and subsequently transmitting a signal to the monitoring device through the tire. The keypad has at least one switch to assign a tire location for every tire on the vehicle.

The tire condition monitoring device periodically senses a condition within the tire, including measurement of tire temperature and/or air pressure. The sensed condition information is then electronically stored and the sensed condition information is compared with preset parameters based on previously stored condition information.

If the sensed tire condition data falls within the preset parameters, the transmitter of the monitoring device periodically telemeters the sensed condition information and the monitoring device identification code in pulse modulated signal to a receiver in electronic communication with the monitoring device. The receiver is usually mounted in the cab of the vehicle. The receiver communicates this information to a cab mounted visual display unit which visually displays the information.

The monitoring device immediately telemeters the sensed condition information and identification code to the receiver if the sensed condition information falls without the preset parameters. The visual display unit includes an audible alarm for alerting a vehicle passenger of a change of sensed tire conditions.

The sensed condition information is telemetered less frequently during periods of low vehicle and tire activity. The monitoring device is reactivated upon tire or vehicle reactivity.

In another embodiment of the present invention, a monitoring device having a battery, an air pressure sensor in circuit with the battery, a transmitter in circuit with the air pressure sensor and the battery, and a motion detector in circuit with the battery is positioned within the tire. The air pressure sensor comprises a mechanical sensor which is positioned entirely within the tire. The mechanical air pressure sensor includes a housing having a conductive portion, a pressure sensitive diaphragm positioned within the housing, a first conductive terminal in contact with the battery and the conductive diaphragm, and a second conductive terminal in physical contact with the conductive portion of the housing and the transmitter.

A receiver is in electronic communication with the transmitter and a cab mounted alarm. An encoder can be included in the monitoring device for generating a vehicle specific signal.

The motion detector is used to determine whether the tire is rotating at a predetermined velocity. Once the predetermined velocity is reached, power is supplied from the battery to the first terminal and the diaphragm. Tire pressure which has dropped below a predetermined level is determined when the ambient pressure within the tire decreases to the point where the diaphragm expands to physically contact the conductive portion of the housing, creating a conductive relationship between the diaphragm and the conductive portion of the housing, and thus the second terminal. Electrical power is transferred from the diaphragm to the transmitter via the conductive portion of the housing and the second terminal. The transmitter generates a signal to the receiver to activate the alarm and alert the driver of existence of a low pressure tire.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
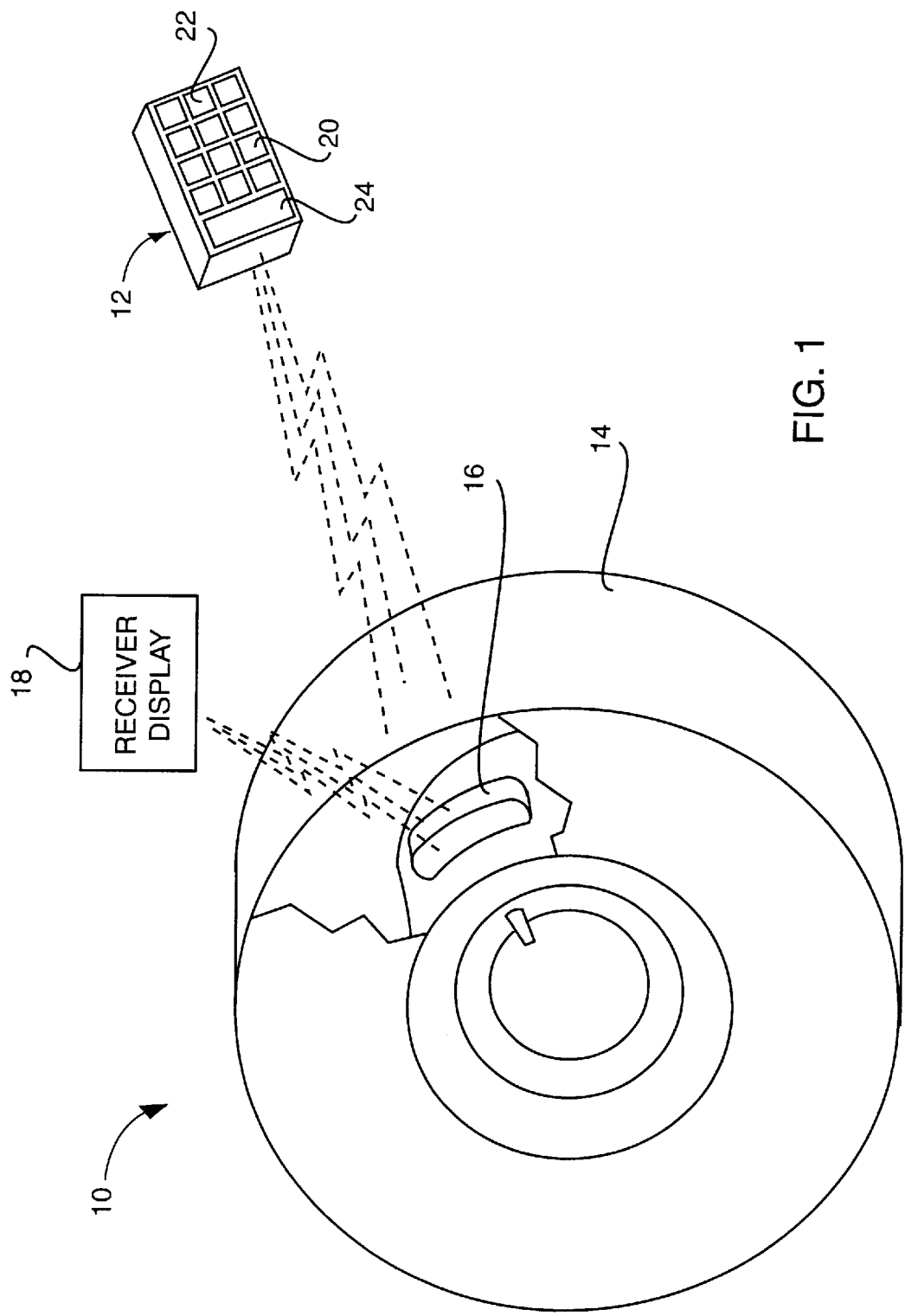
FIG. 1 is a schematic representation of the system of the present invention wherein a partially fragmented tire having a tire condition monitoring device embodying the present invention secured therein is receiving a signal from a hand-held transmitter held close thereto, the monitoring device being in electronic communication with a receiver and display unit.

As shown in the drawings for purposes of illustration, the present invention is concerned with a tire condition monitoring system generally referred to by the reference number 10.

A first embodiment of the system 10 is schematically illustrated in FIG. 1 and is generally comprised of a hand-held transmitting wand 12 which, when held in relatively close relation to a tire 14 containing a tire condition monitoring device 16, transmits information to a monitoring device 16 through a wall of the tire 14, the monitoring device 16 in turn transmits information to a receiver and display unit 18, usually positioned in a cab portion of the vehicle.

Figure 2:
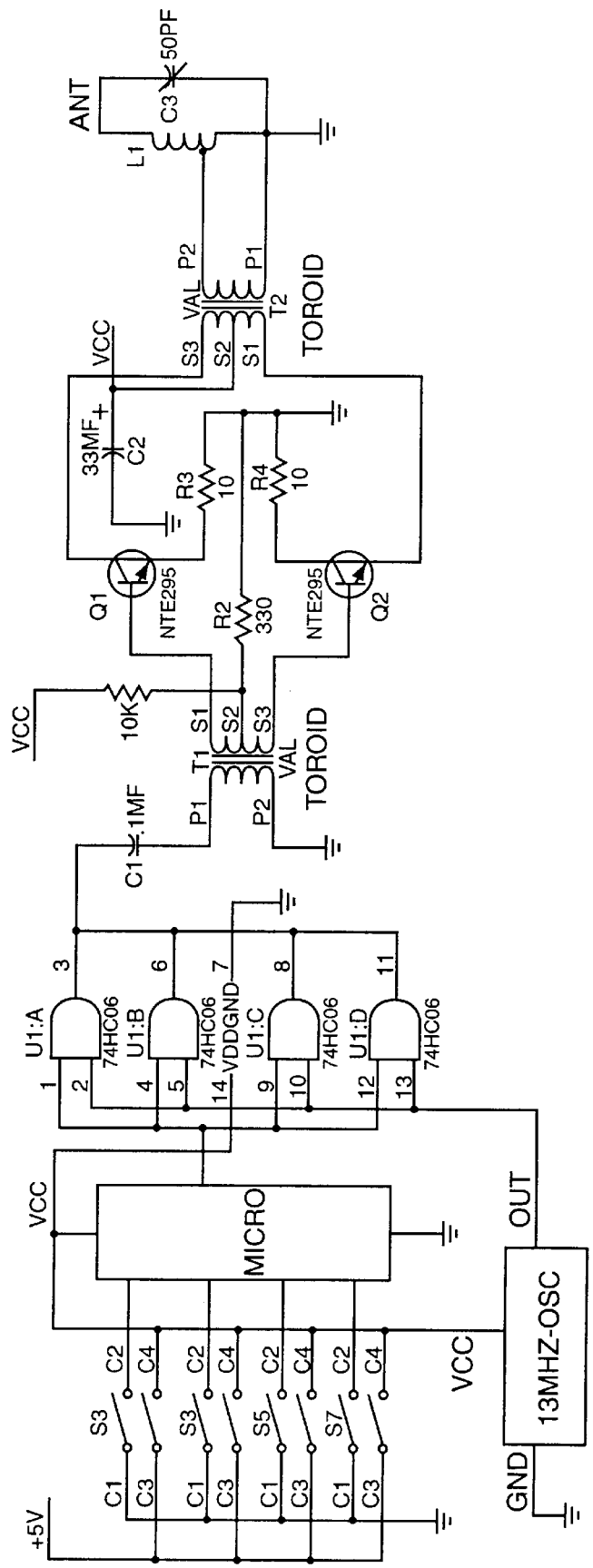
FIG. 2 is an exemplary electronic schematic of the hand-held transmitter used in conjunction with the monitoring device.

The hand-held transmitter wand 12 includes a keypad 20 having a plurality of keys 22. As a key 22 is pressed, tire position data is assigned to the monitoring device 16 for that particular tire 14. In the case of a four-wheel vehicle, the hand-held transmitter 12 has at least four keys 22, one for each tire position. For vehicles having eighteen wheels, the hand-held transmitter 12 has ten keys and an outside/inside switch to denote each tire position. The hand-held transmitter 12 may also include a small display 24 to visually verify the inputted information. An electronic schematic of an exemplary hand-held transmitter 12 is illustrated in FIG. 2.

Figure 3A:
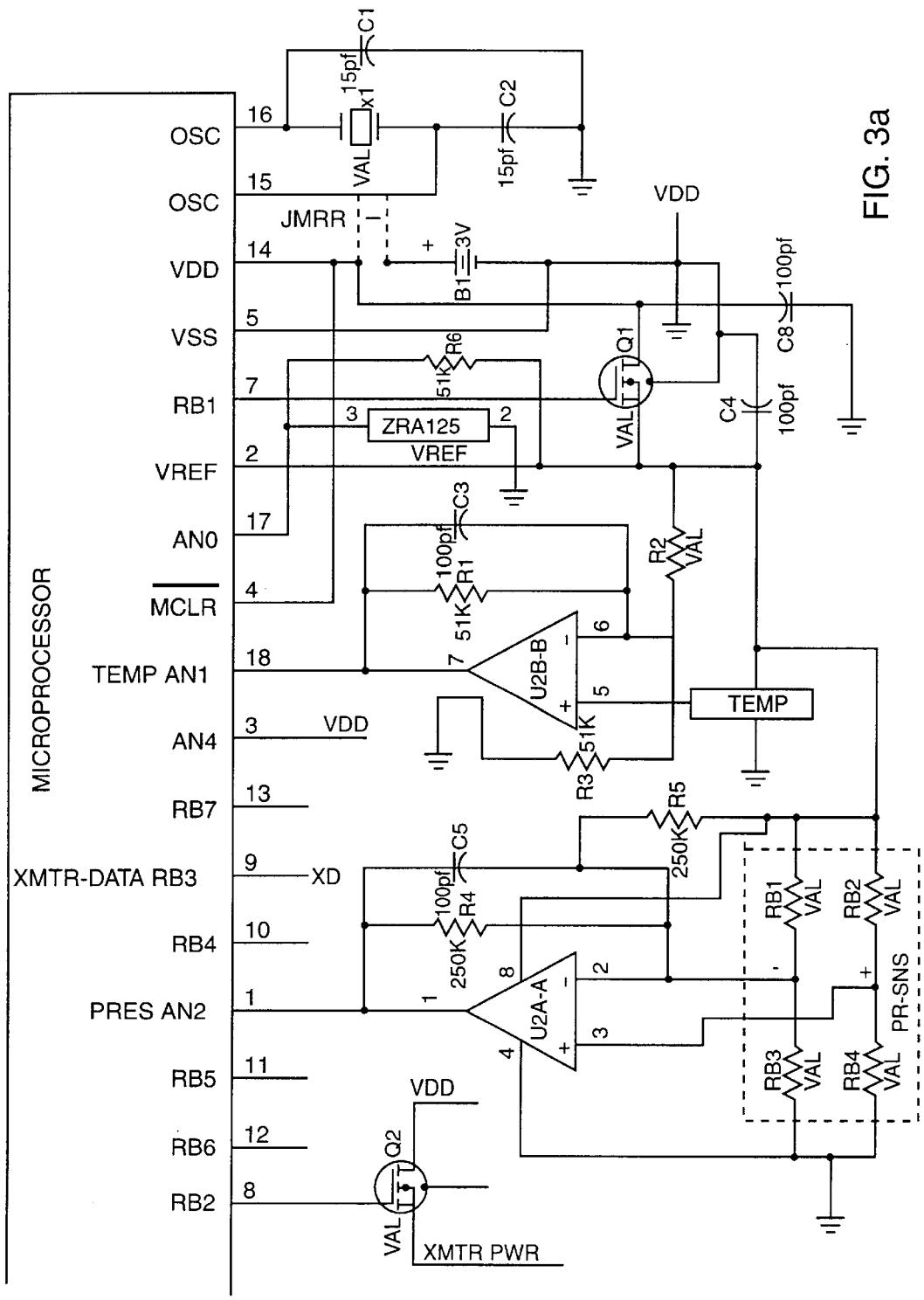
FIG. 3a is an exemplary electronic schematic of a microprocessor and sensors of the monitoring device.
Figure 3B:
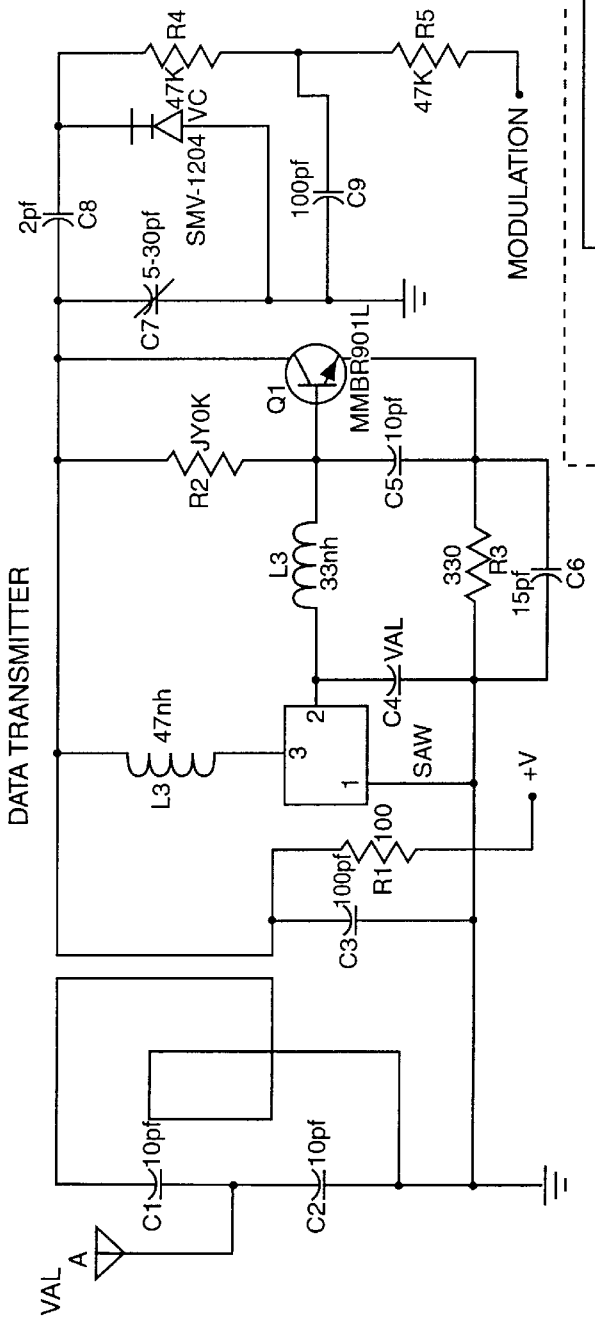
FIG. 3b is an exemplary electronic schematic of a data transmitter of the monitoring device.
Figure 3C:
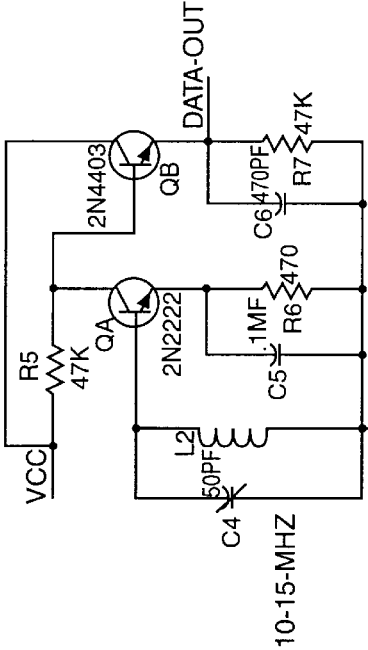
FIG. 3c is an exemplary electronic schematic of a signal pick-up coil of the monitoring device.
Figure 4A:
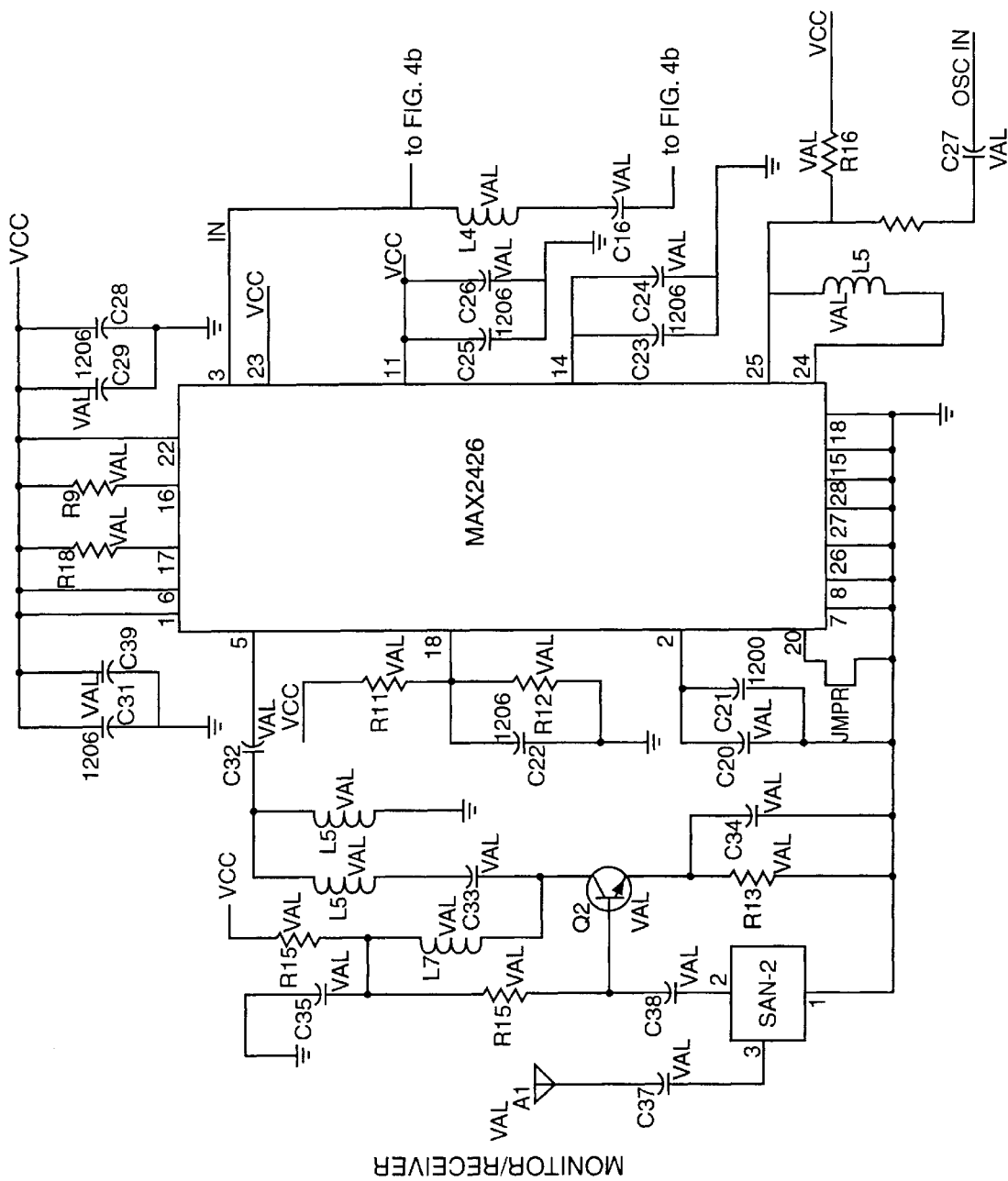
FIGS. 4a–4d are exemplary electronic schematics of a receiver and visual display used in conjunction with the monitoring device.
Figure 4B:
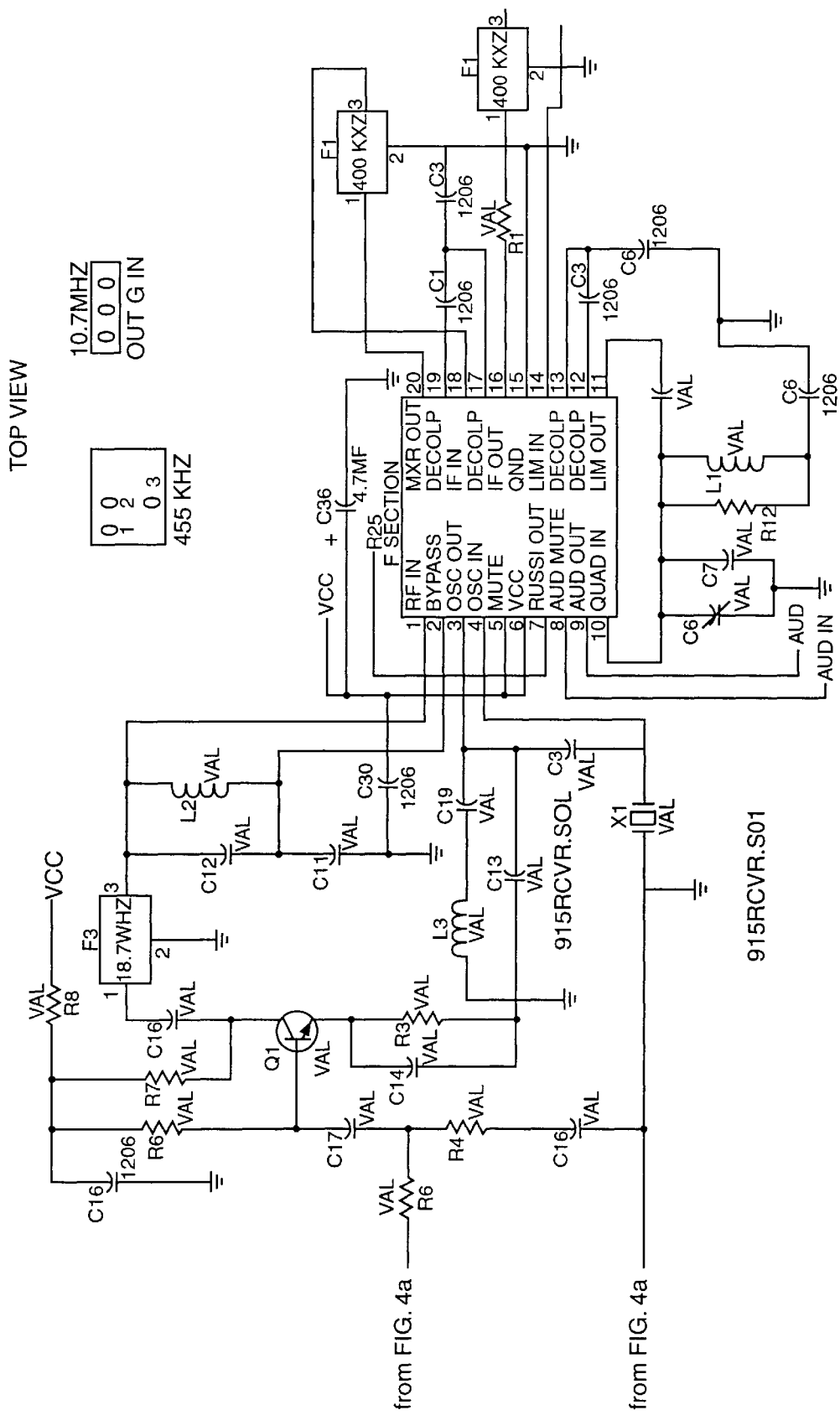
Figures 4C, 4D:
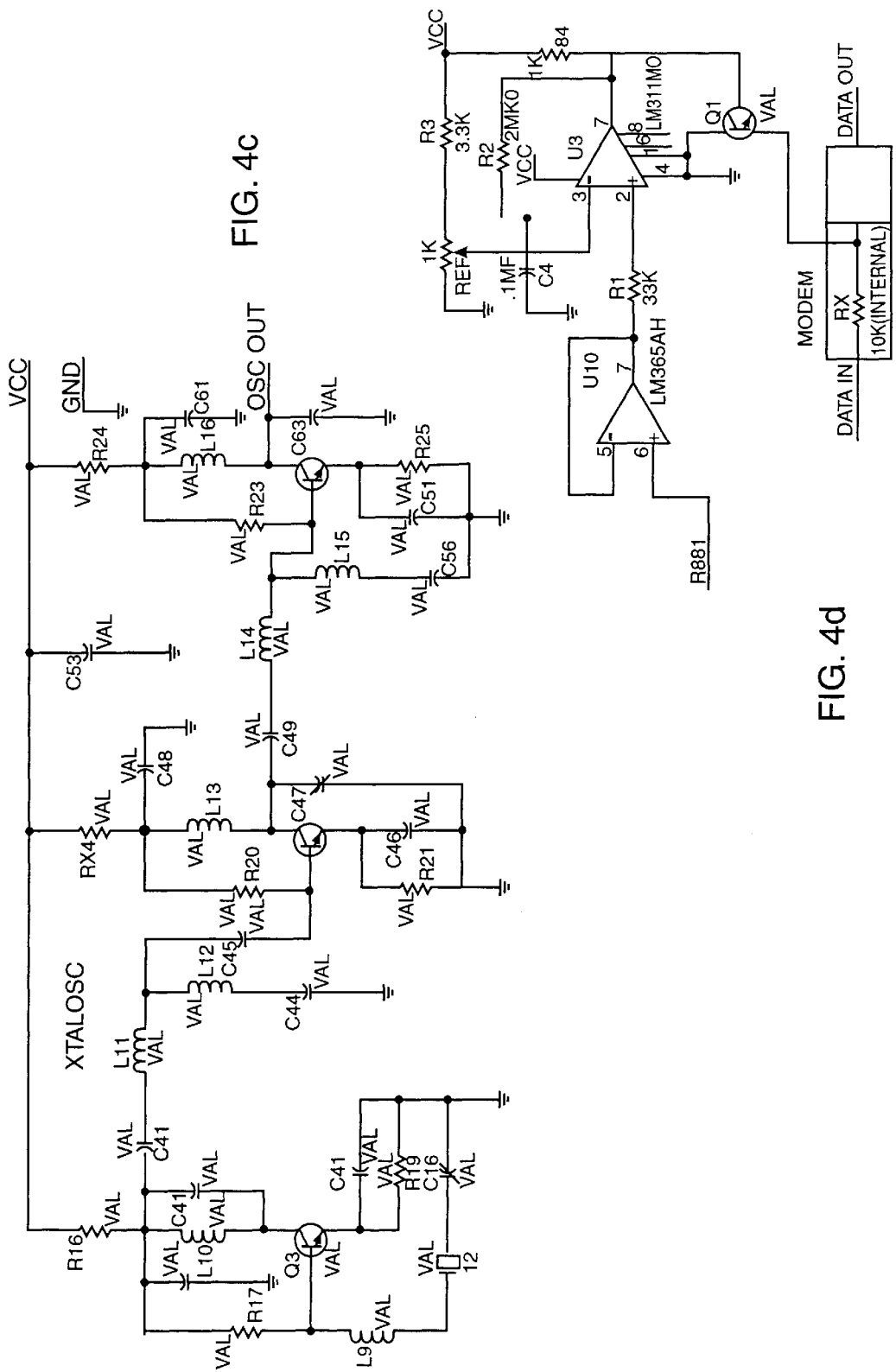

The monitoring device 16 is comprised of an etched circuit board made of epoxy glass to hold various components including a long-life lithium battery, various sensors (including pressure and temperature sensors), an inductive pick-up coil, a microprocessor, and a transmitter. The inductive coil needs no power from the battery and receives signals sent from the hand-held transmitter 12. The microprocessor processes the electrical signals from the sensors and hand-held transmitter 12 and stores data and the algorithm of the system. The sensors can also be implemented for other tire conditions including tire revolution and/or mileage, tire identification information such as serial number, manufacturing data, tire size or retread information. The transmitter signals information to the receiver/display unit 18. The transmitter of the monitoring device 16 includes a SAW filter for production of pulse modulated transmission signals. Exemplary electronic schematics of the circuitry of the monitoring device 16 are illustrated in FIGS. 3a–c. Each monitoring device 16 is given a unique identifying serial number, comprising up to a twenty-four bit code, when manufactured. This identification code is programmed into the memory of the monitoring device 16 so that no man readable labels are necessary. The monitoring device 16 is encapsulated in a durable molded rubber casing which can be securely attached to an inner tire wall or tire rim.

The monitoring devices 16 are calibrated at the factory and shipped in a low power consumption dormant state. The monitoring devices 16 are selected at random for installation. After installation, the monitoring devices 16 are activated by assigning a tire position using the hand-held transmitter 12 as described above. The monitoring device 16 awakes from its dormant state and transmits its identification number and tire location to the receiver/display unit 18. The monitoring device identification number and tire location are stored in the receiver/display unit 18 and an audible tone is emitted to confirm the reception of the information. The stored tire locations corresponding to the monitoring device identification numbers can be changed as tires are replaced or the tires are moved to different locations on the vehicle.

Once activated the monitoring devices 16 periodically self-activate at random intervals to sample and store engineering information, such as pressure and temperature readings. The monitoring device 16 transmits data, including temperature and pressure readings, to the receiver/display unit 18 after predetermined time intervals (usually fifteen minutes) to confirm system integrity. The receiver/display unit 18 stores and displays the relevant pressure and tire information according to tire position. The receiver/display unit 18 can also collect operational data from the transmissions which can be downloaded to a database for tire service history and preventative maintenance assistance.

If the pressure and temperature readings vary from previous readings by preset limits the information is transmitted immediately, even if the fifteen minute interval has not elapsed. If the receiver/display unit 18 does not receive a transmission from a monitoring device 16 during a predetermined period, such as thirty minutes, it will alarm to indicate a failure of that monitoring device 16. The operation and logic of the system 10 are more fully described in the flow charts of FIGS. 5–13.

Figure 5:
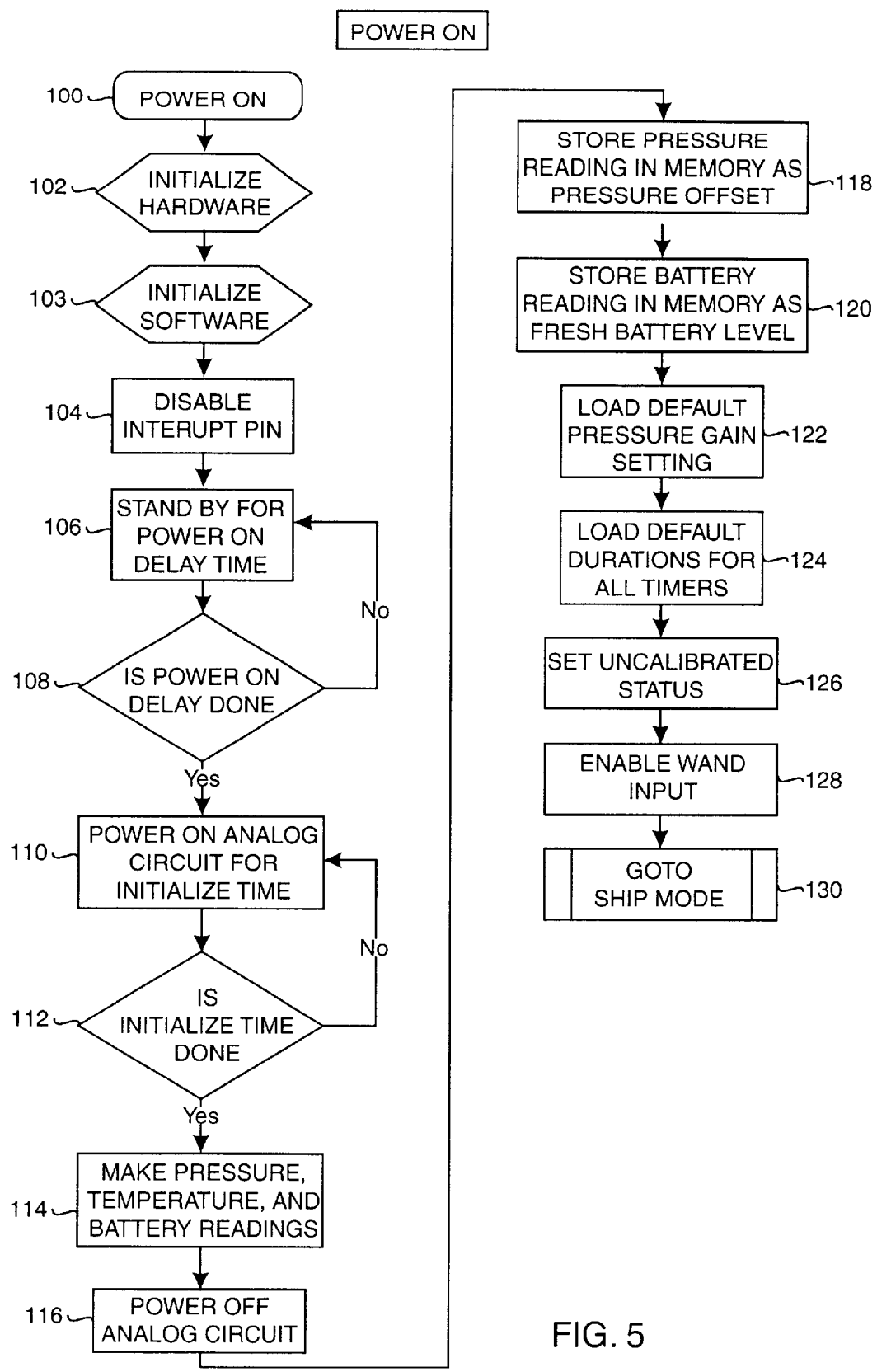
FIG. 5 is a flowchart illustrating the steps of powering on and initializing the monitoring device prior to shipment.

With reference to FIG. 5, the monitoring device 16 is calibrated at the factory by first powering on the monitoring device 16 (100). The hardware and software are then initialized (102 and 103). The wand input for the hand-held transmitter wand is then disabled (104) so that the calibration sequence can proceed without interference from inadvertent commands issued by hand-held transmitters in the area. The monitoring device 16 stands by for power according to a delay time (106) and once the delay time has passed (108) the analog circuit is powered for an initialize time period (110). Once the initialize time period has elapsed (112) pressure and battery readings are taken (114) and the analog circuit is powered off (116).

The pressure and battery levels represent atmospheric pressure and current battery level measurements which are stored in memory as pressure offsets (118) and fresh battery levels (120). A default pressure gain setting and default durations for all timers are then loaded (122 and 124). The monitoring device 16 is set in an uncalibrated status (126), the hand-held transmitter wand input is re-enabled (128) and the monitoring device 16 enters a shipping mode (130).

Figure 6:
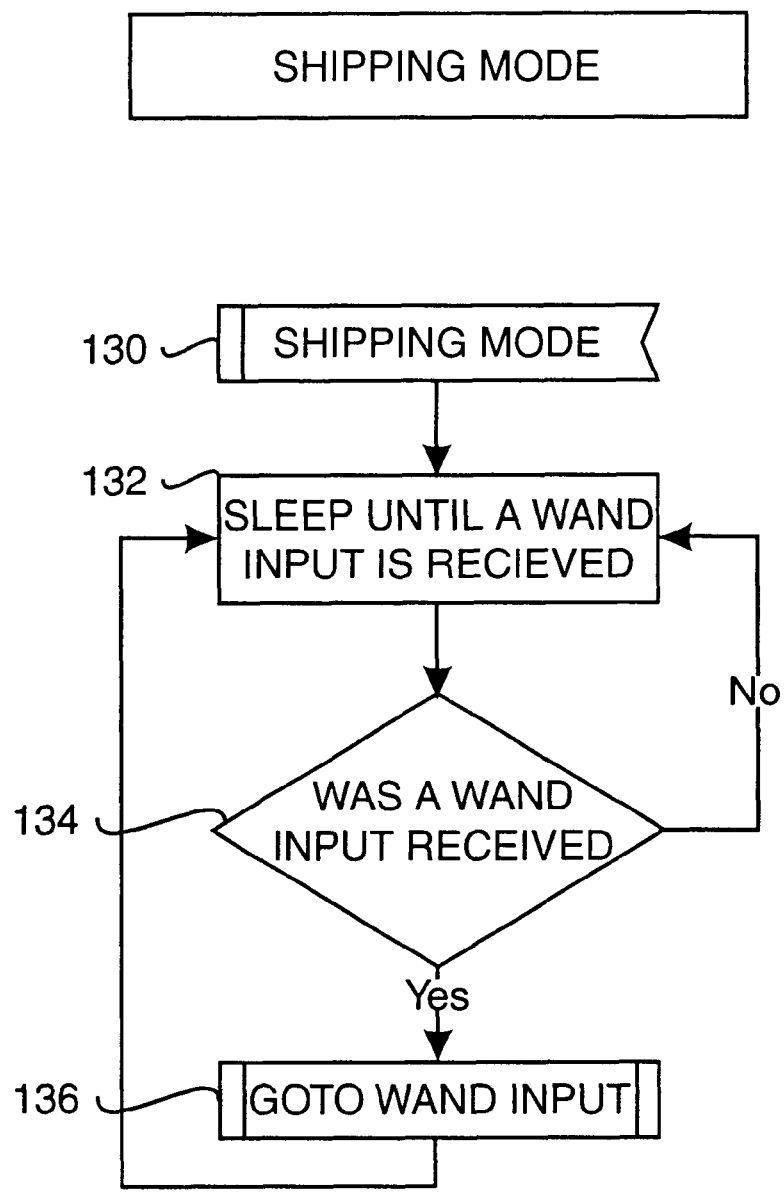
FIG. 6 is a flowchart illustrating the steps taken during shipment and storage of the monitoring device.

Referring to FIG. 6, while in the shipping mode (130) the monitoring device 16 remains in a dormant sleep state until input is received by the hand-held transmitter wand (132). After verifying that the input received was from the hand-held transmitter wand (134), the monitoring device 16 enters a wand input routine (136).

Figure 7:
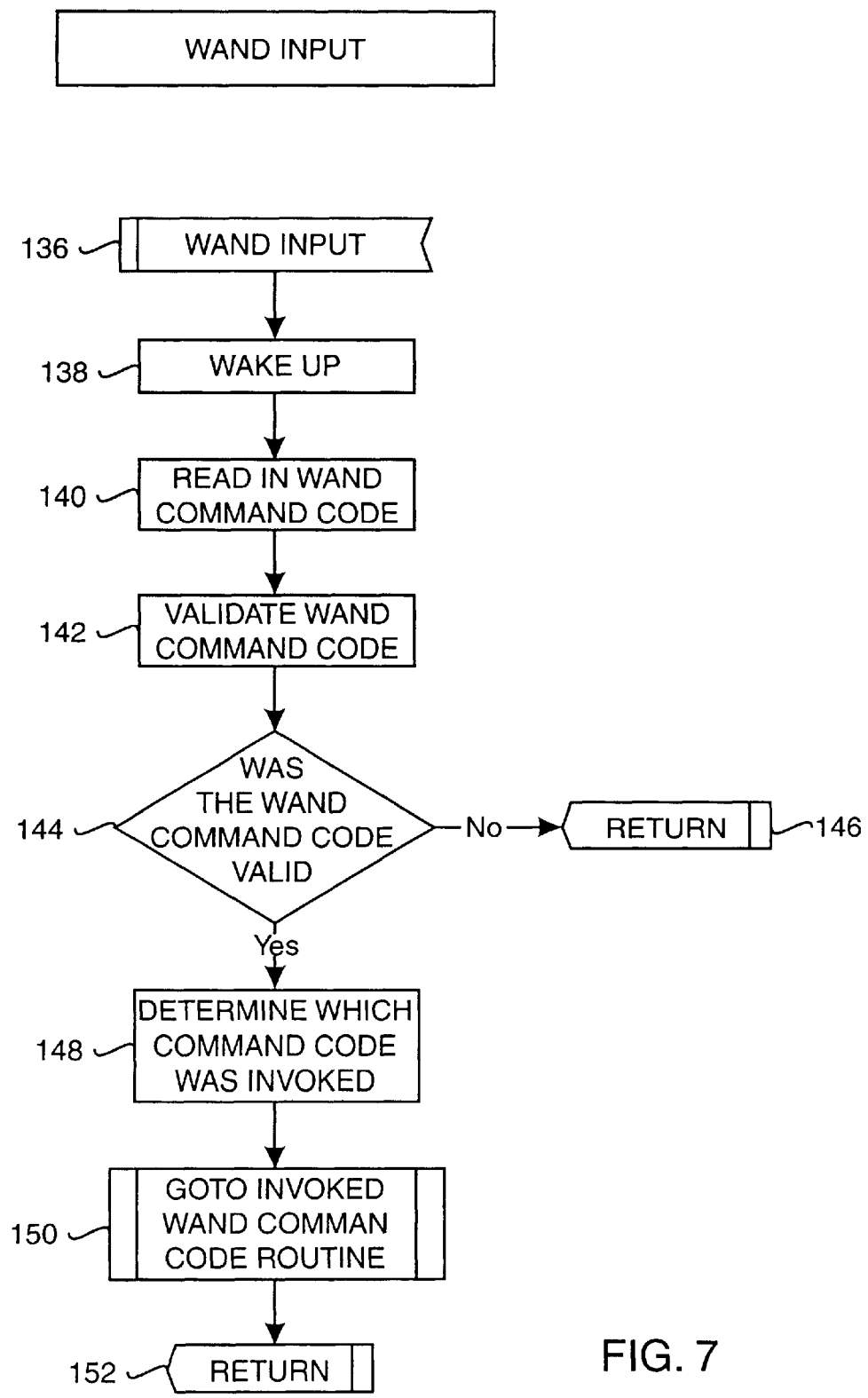
FIG. 7 is a flowchart illustrating the steps taken when the monitoring device is activated by the hand-held transmitting wand.

With reference to FIG. 7, the want input routine (136) includes the first waking the monitoring device from its dormant sleep state (138). The hand-held transmitter wand command code is then read and validated (140 and 142). A determination is made as to whether the wand command code is valid or not (144). If it is determined not to be valid, the monitoring device 16 returns to its dormant state (146). If the command code is determined to be valid, the command code which was invoked is determined (148) and the appropriate command code routine is accessed (150). Several key command code routines, such as pressure, tire diagnostics, and other features can be accessed at this point. Once finished, the monitoring device 16 returns to the appropriate routine (152).

Figure 8:
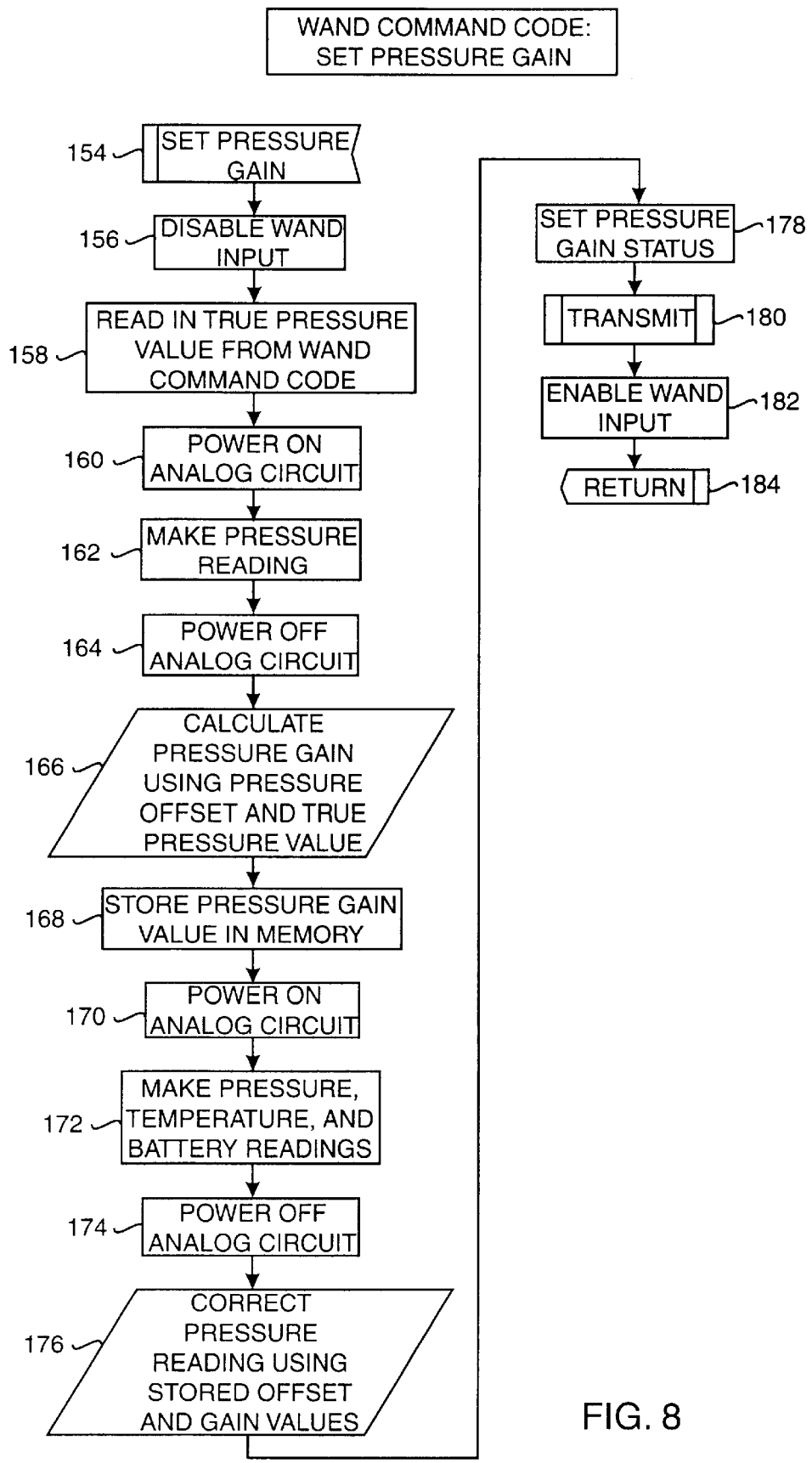
FIG. 8 is a flowchart illustrating the steps taken to set the pressure gain after activation by the hand-held transmitter wand.

A command code which is given at the factory is the set pressure gain command code (154), illustrated in FIG. 8. The hand-held transmitter wand input is disabled (156) so as not to interfere with the routine and a true pressure value from the wand command code is read (158) by powering on the analog circuit (160), and reading the pressure (162) and then powering off the analog circuit (164). This is accomplished in the factory by placing the monitoring device 16 in a chamber which is pressurized to a level approximating the anticipated tire pressure which the monitoring device 16 is to be exposed to. For example, in a standard passenger vehicle the monitoring device is subjected to 32 psi. Increased values, such as 50, 90 or 100 psi may also be used as appropriate. The pressure gain is calculated (166) using the pressure offset (118) and the true pressure value (158). The pressure gain value is then stored in the memory (168).

The analog circuit is then powered on (170), pressure, temperature, and battery readings are made (172), and the analog circuit is then powered off (174). The correct pressure reading is stored using offset and gain values (176) and the uncalibrated status is cleared (178) as a quality check and final step in calibration. The pressure, temperature and battery readings are transmitted (180) (and more specifically described in FIG. 13), the hand-held transmitter wand input is re-enabled (182), and the monitoring device 16 returns to its dormant state (184).

Figure 9:
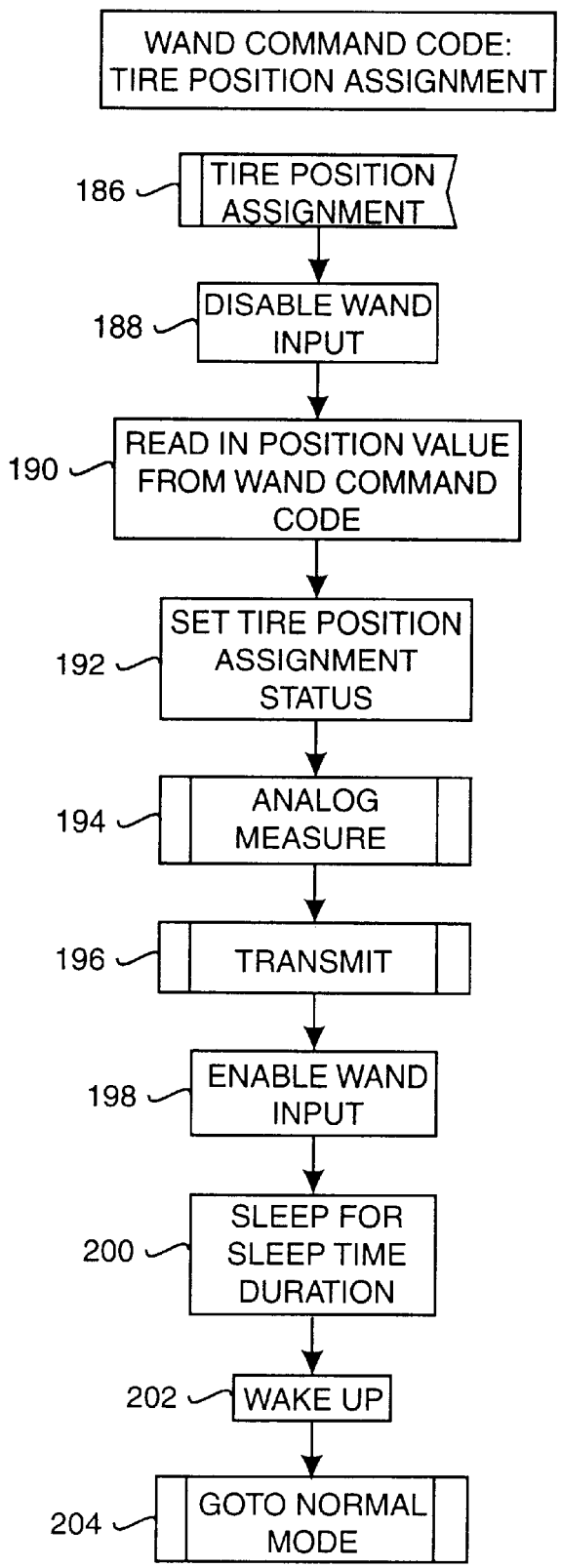
FIG. 9 is a flowchart illustrating the steps taken to assign tire position to the monitoring device by the hand-held transmitter.

The command code routine for tire position assignment (186) is illustrated in FIG. 9. After disabling the hand-held transmitter wand input (188), the position value from the wand command code is read (190) and the tire position assignment status is set (192). The monitoring device 16 then sets the pressure and/or temperature values to zero (194). These measurements and other relevant data are transmitted (196) to the receiver/display unit 18 (as more fully described in FIG. 13). The hand-held transmitter wand input is then re-enabled (198), the monitoring device 16 enters a sleep mode for a predetermined duration (200) after which it wakes up (202) and enters the normal mode of operation (204).

Figure 10:
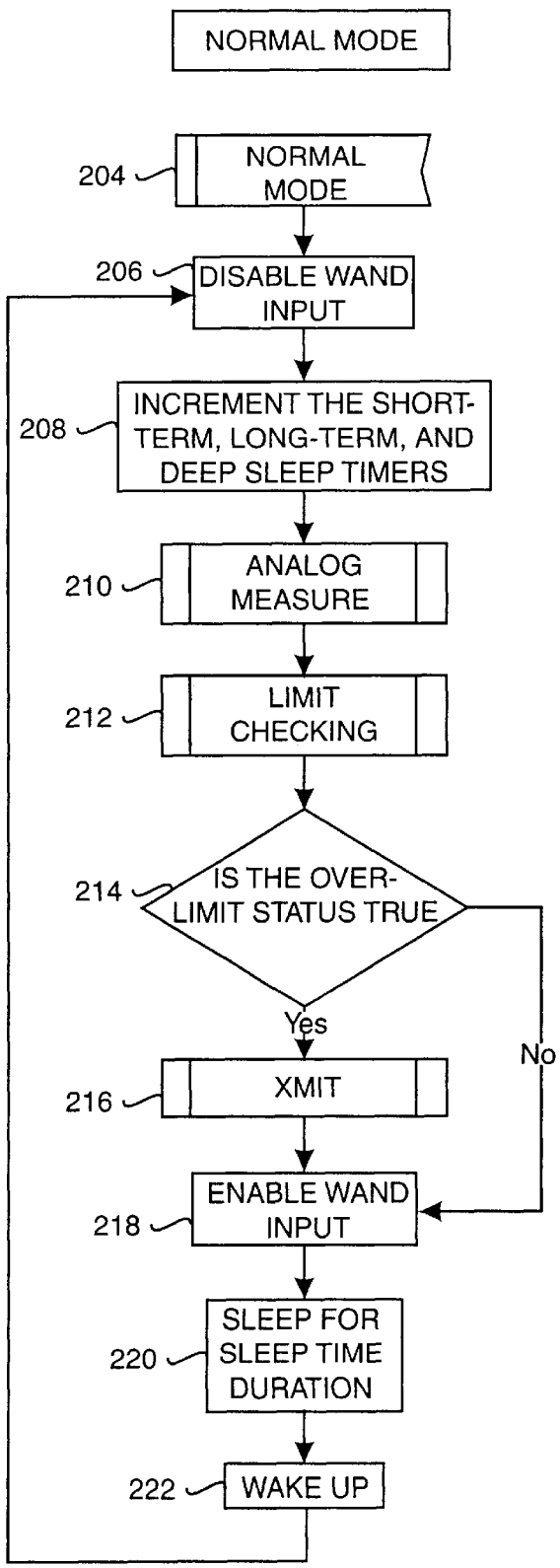
FIG. 10 is a flowchart illustrating the steps taken during normal operation of the monitoring device.

In the normal mode of operation (204), illustrated in FIG. 10, the hand-held transmitter wand input pin is disabled (206) and the short-term, long-term and deep sleep timers are incremented (208) as necessary. These timers may be altered due to vehicle and/or tire inactivity. For example, if the vehicle is parked overnight the sensors and circuitry within the monitoring device 16 will detect that there is little activity overtime. In order to conserve battery power and also to avoid unnecessary transmissions, the monitoring device 16 enters an inactive state where fewer transmissions are made over time.

Upon vehicle reactivity, such as the entering of a passenger in the car or the rotation of the tires which is sensed as pressure and/or temperature changes, the monitoring device 16 is returned to the active state. After adjusting the timers, analog measurements are taken (210) and the limits and changes in the measurements are checked (212). If the measurements are over the limit status (214) a transmission (216) is immediately made and then the hand-held transmitter wand input pin is re-enabled (218). If the measurements are not over the limit status, no immediate transmission is made and the input pin is re-enabled (218).

The monitoring device 16 then enters a dormant sleep mode for a predetermined time duration (220) after which it automatically awakes from the dormant mode (222) and initiates the process again. It should be noted that this routine covers the short-term sleep timer scenario where a transmission is made only if there is a change in readings or the limits are exceeded. Once the long-term timer elapses, a transmission of relevant data is made regardless of whether the limits are exceeded or not.

Figure 11:
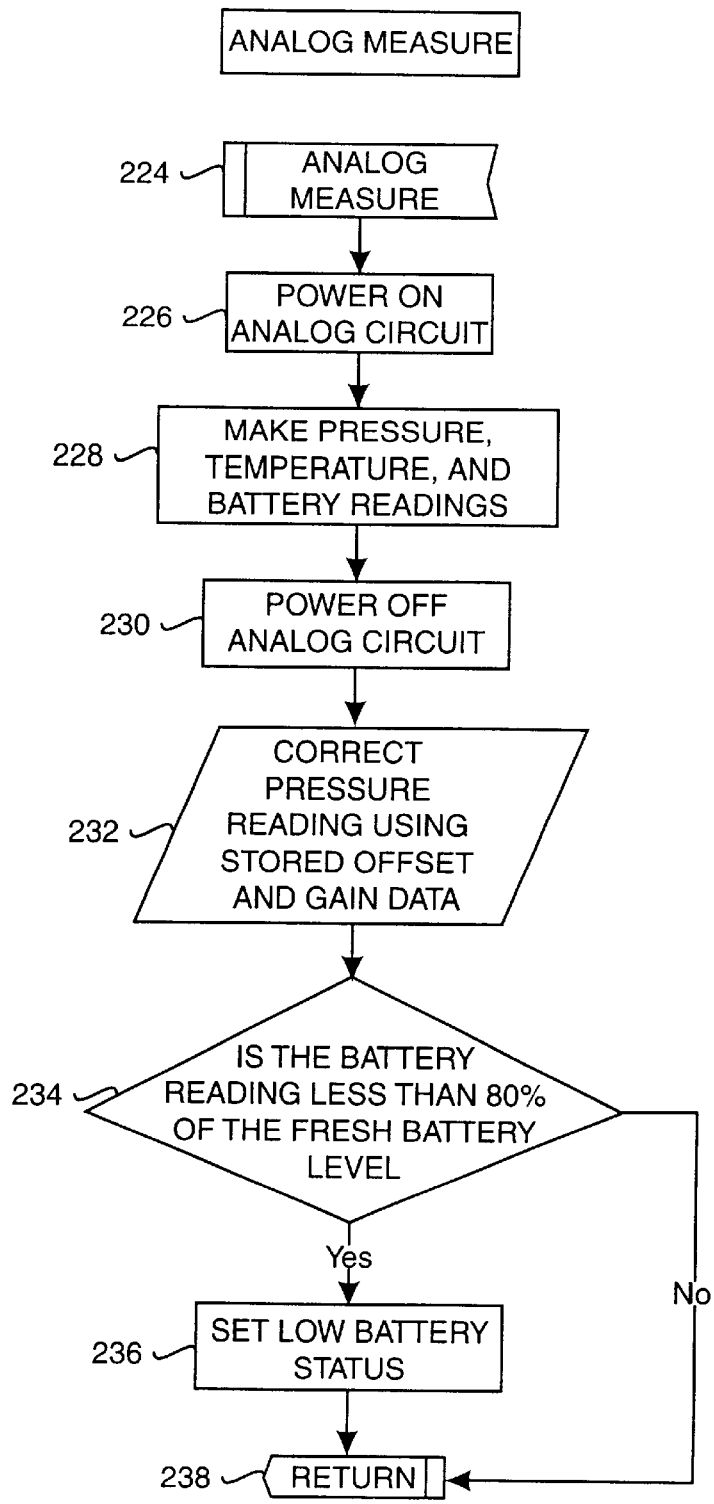
FIG. 11 is a flowchart illustrating the steps taken during measurement of tire conditions by the monitoring device.

Referring now to FIG. 11, the routine for analog measure (224) includes powering on the analog circuit (226), making pressure, temperature and battery readings (228) and powering off the analog circuit (230). The pressure reading is corrected using the stored offset and gain data (232). It is then determined whether the battery reading is less than 80% of the fresh battery level (234). If the battery reading is less than 80%, a low battery status is set (236), the low battery information is transmitted to the receiver/display unit 18 and then the routine returns either to the dormant state or the next step of the appropriate routine (238). Due to the on/off nature and low power consumption of the monitoring device 16, the battery will continue to operate for several weeks or more even after the low battery signal is sent. If the battery reading is not less than 80%, the routine returns either to the dormant state or the next step of a larger routine (238).

Figure 12A:
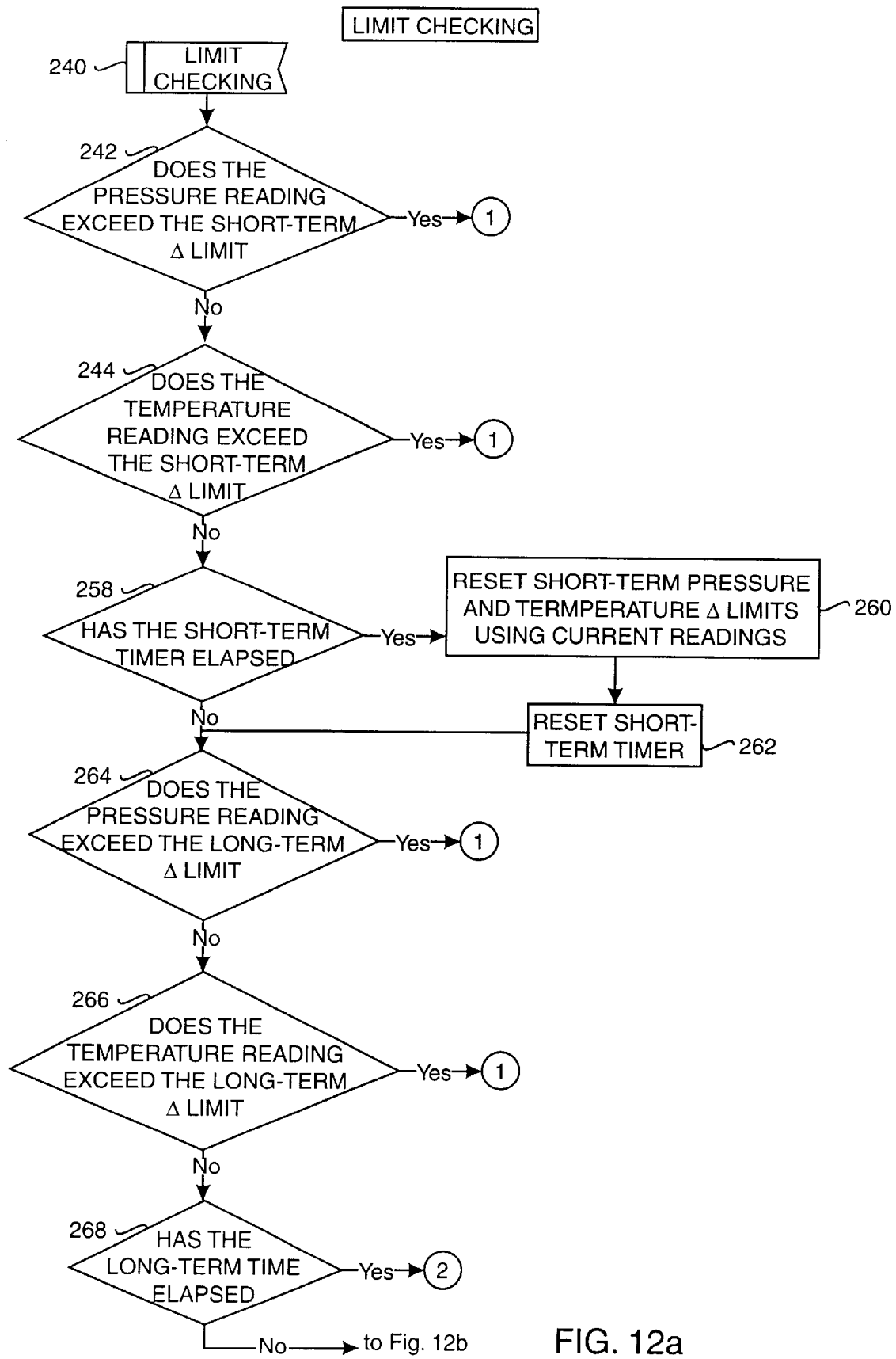
FIGS. 12a and 12b are flowcharts illustrating the steps taken during comparison of the measured conditions to preset limits and expiration of internal timers.
Figure 12B:
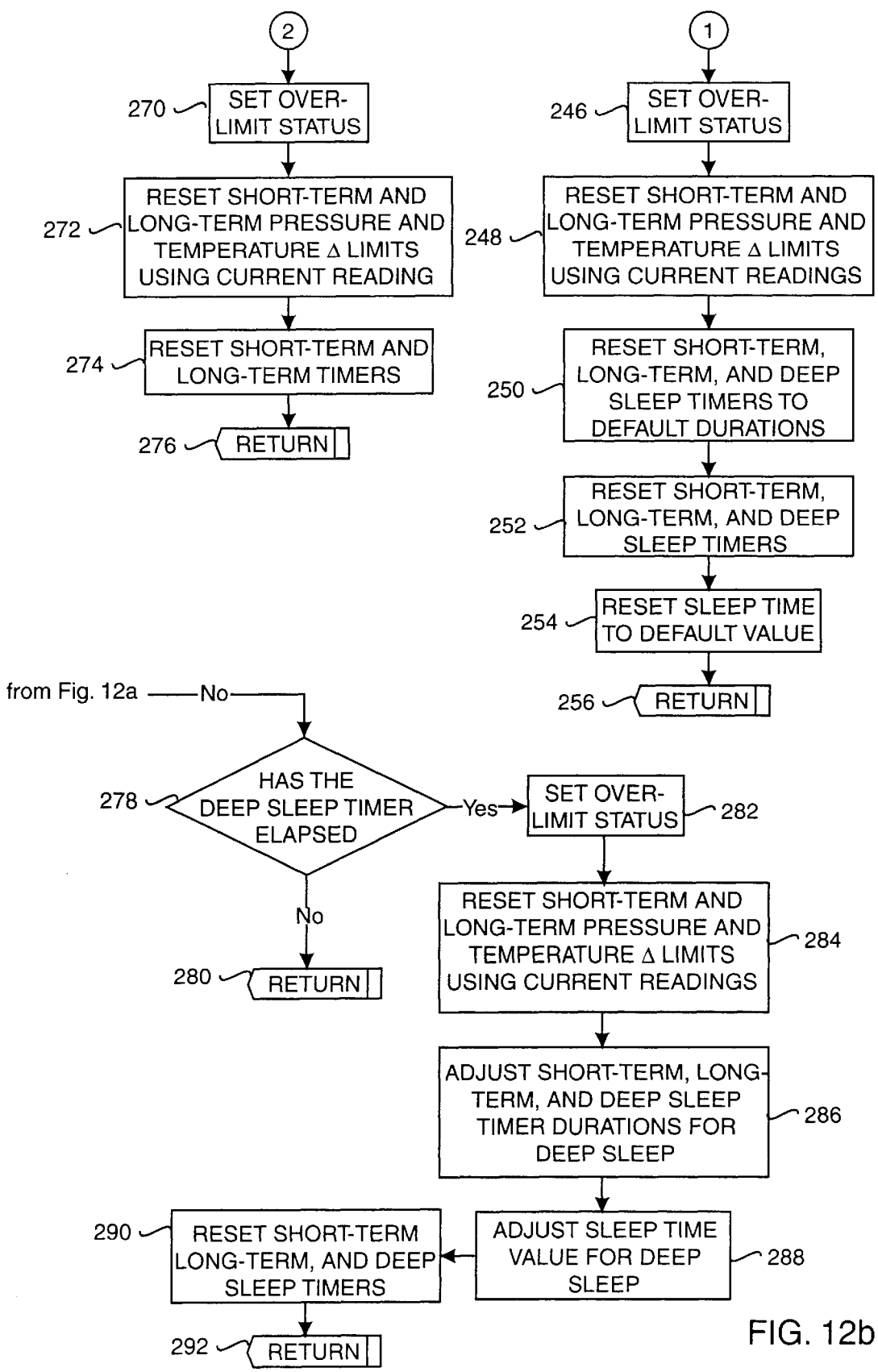

Referring to FIGS. 12a and 12b, the routine for limit checking (240) includes comparing the pressure and temperature readings to the short-term limits and determining whether these readings exceed the predetermined limits (242 and 244). This typically occurs when the pressure changes by 1 p.s.i. or less.

If either the pressure or temperature readings exceed the limits, the over-limit status is set (246) as detailed in sub-flowchart 1 of FIG. 12. After setting the over-limit status (246), which results in a transmission to the receiver and display unit 18, the short-term and long-term pressure and temperature limits are reset using the current readings (248). As there has been a transmission and the long-term timers are intended to send transmissions at predetermined intervals to confirm integrity of the system and the deep sleep timers are intended to be used during prolonged periods of inactivity, the short-term, long-term and deep sleep timers are also reset to default durations (250 and 252) to lengthen the time between measurements and transmission to avoid unnecessary transmissions which shorten the life of the battery. The sleep time for the monitoring device 16 is also reset (254) and the system returns to the routine (256).

If the pressure and temperature readings do not exceed the limits, it is next determined whether the short-term timer has elapsed (258). If it has, current readings from the analog measure are used to reset the short-term pressure and temperature limits (260) and the short-term timer is reset (262). If the short term timer has not elapsed, it is determined whether the pressure and temperature readings exceed the long-term limits (264 and 266). This typically occurs when the tire pressure changes by approximately 4–5 p.s.i. over the length of the long-term timer. If either the pressure or temperature readings exceed the long-term limits, the routine of sub-flowchart 1 is followed as described above.

If the pressure and temperature readings do not exceed the long-term limits, it is determined whether the long-term timer has elapsed (268). If the long-term timer has elapsed, the over-limit status is set (270), a transmission is made, the short-term and long-term pressure and temperature limits are reset using current readings (272), the short-term and long-term timers are reset (274) and the system is returned to the routine (276) according to sub-flowchart 2.

If the long-term timer has not elapsed, it is then determined whether the deep sleep timer has elapsed (278). During periods of inactivity, the deep sleep timer is the default timer and all other timers are adjusted accordingly. If the deep sleep timer has not elapsed the system returns to the routine (280). If the deep sleep timer has elapsed, the over-limit status is set (282) and a transmission is made. The pressure and temperature limits are reset using current readings (284), the short-term, long-term and deep sleep timers are adjusted for deep sleep values (286 and 288) and reset (290) and the system returns to the appropriate routine (292).

Figure 13:
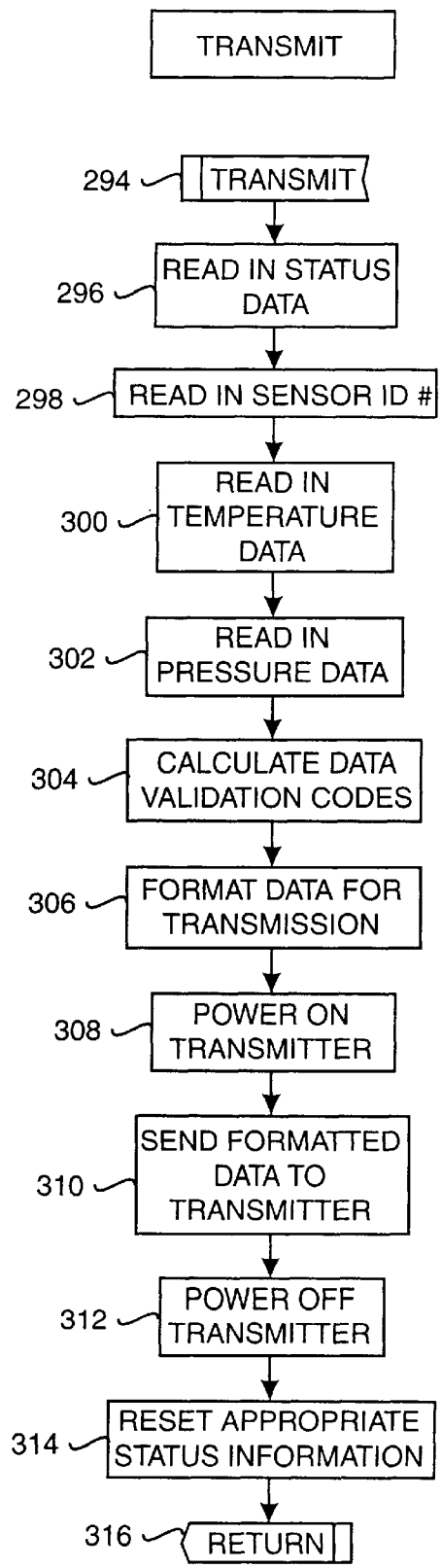
FIG. 13 is a flowchart illustrating the steps taken during transmission tire condition data by the data transmitter of the monitoring device to the receiver of the monitoring system.

As illustrated in FIG. 13, the routine for data transmission (294) begins by reading in the status data (296) and sensor identification number (298). The temperature and pressure data are next read (300 and 302). The data validation codes are calculated and the data is formatted for transmission (304 and 306). The transmitter is powered on (308), the formatted data is sent to the transmitter (310) and the transmitter transmits this data and then powers off (312). The transmitter preferably sends either a pulse width or a frequency shift key (FSK) signal, collectively referred to as a pulse modulated signal, to avoid interference. The appropriate status information is reset (314) and the system returns either to its dormant state or the next step of the larger routine (316).

A second embodiment utilizes the same operating procedure described above, but eliminates the use of the hand-held transmitter 12. In order to activate, the installed monitoring device 16 is subjected to a predetermined pressure. For example, the tire 14 may be filled to 50 p.s.i. at which point the monitoring device 16 will awaken from it factory dormant state and begin transmission and normal operation. The pressure can be adjusted to 32 p.s.i. for passenger car tires after activation. Tire position information is obtained by selecting the tire position on the receiver/display unit 18 and pressurizing that particular tire. The process is repeated after tire replacement or relocation.

Figure 14:
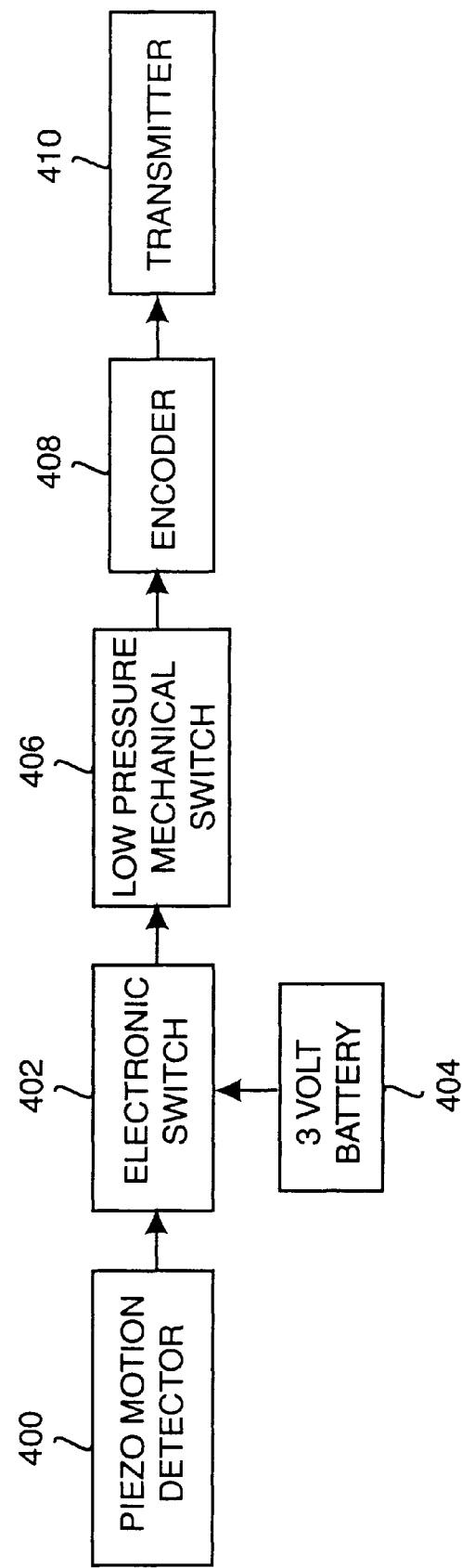
FIG. 14 is a functional block diagram of another embodiment of the system of the present invention utilizing a mechanical pressure sensor.

A third embodiment of the present invention is illustrated in the functional block diagram of FIG. 14. The monitoring device 16 includes a piezo motion detector 400 which is preset to close an electronic switch 402 and provide power from a battery 404 to a mechanical pressure sensor 406 when the tire 14 is rotating at a predetermined rate. Typically, the tire 14 must be traveling at least 5 m.p.h. to activate the switch 402 in order to conserve power and prolong the useful life of the battery 404. If the tire pressure drops below a predetermined level, the mechanical sensor 406 conducts power to an encoder 408 which delivers a vehicle specific coded data stream to a transmitter 410 for transmission to the receiver/display unit 18 within the cab of the vehicle. Upon receiving the transmitted signal, the receiver/display unit 18 alarms to alert the driver that one of the tires 14 has low pressure. The driver can then inspect the tires 14 to determine which tire needs to be filled up or repaired.

Figure 15:
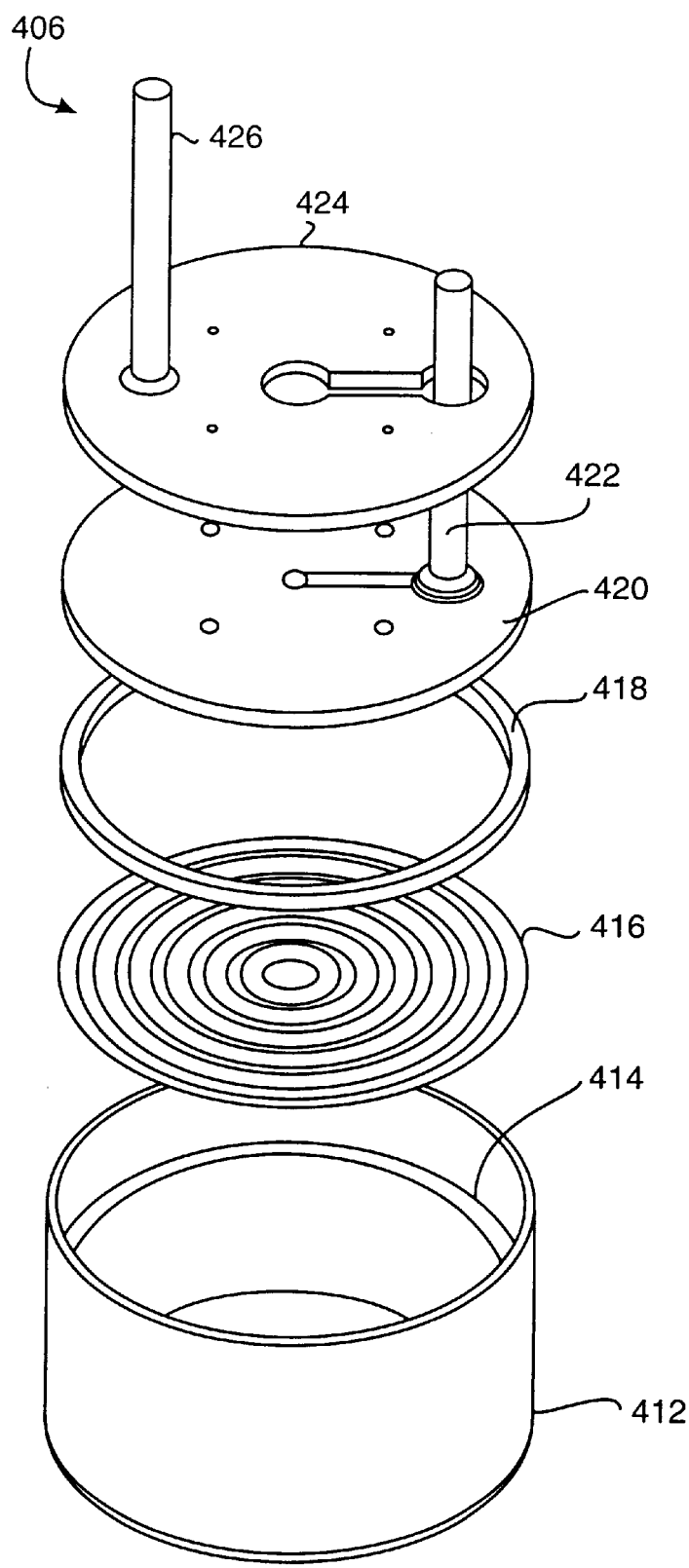
FIG. 15 is an exploded perspective view of the mechanical pressure sensor of the system of FIG. 14.

The mechanical pressure sensor 406 is illustrated in FIG. 15. The sensor 406 is comprised of a generally cylindrical conductive housing 412 having an internal non-conductive lip 414. The lip 414 supports a conductive elastic diaphragm 416, typically a metal aneroid diaphragm which expands and contracts according to pressure variations. A compression ring 418 separates the diaphragm 416 from a central contact plate 420 having a terminal pin 422 extending therefrom to connect to the battery 404 and circuitry of the monitoring device 16. The terminal pin 422 is positioned so as to be in constant electrical connection with the diaphragm 416. A conductive peripheral contact plate 424 is positioned over the central contact plate 420 so that there is no electrical contact between the terminal pin 422 and peripheral contact plate 424. The peripheral contact plate 424 is sized so as to be in physical contact with the conductive housing 412. The peripheral contact plate 424 has a terminal pin 426 which extends from the plate 424 to the encoder circuitry 408 of the monitoring device 16.

The mechanical sensor 406 is an integral part of the monitoring device 16 and resides entirely within the tire 14 after installation of the monitoring device 16. The diaphragm 416 of the sensor 406 is fabricated to be in a contracted state and not in physical contact with the housing 412 at a certain predetermined pressure level, for example 18 p.s.i. for passenger vehicles. Once the pressure within the tire 14 drops below this level, the diaphragm 416 expands to physically contact the housing 412. If power is supplied to terminal 422 due to the rotation of the tires, the physical contact between the diaphragm 416 and the housing 412 will result in the power being conducted through the housing 412 and to terminal 426 through peripheral contact plate 424. This acts to close or complete the circuit of the monitoring device 16 and activate the transmitter 410 which sends a signal to the receiver and alarm. When the pressure is equal to or greater than the predetermined pressure level, the diaphragm 416 is in a contracted non-contact state and the circuit remains open with no power being supplied to the monitoring device 16.

While not providing specific tire information, this embodiment is much simpler in design and can be provided at a significantly reduced cost compared to existing tire monitoring systems. This embodiment is also particularly useful in the recently developed "run-flat" tires. As there are little or no adverse effects on the vehicle upon tire deflation, the driver is not aware of the deflated tire and may continue driving until the tire is destroyed. Therefore, the driver must be alerted when one or more tires deflate.

Although several embodiments have been described in detail for purposes of illustration, various modifications may be made to each without departing from the scope and spirit of the invention. Accordingly, the invention is not to be limited, except as by the appended claims.

What is claimed is:

1. A process for monitoring a vehicle tire condition, comprising the steps of:
    positioning a tire condition monitoring device having a unique identification code within a pneumatic tire;
    activating the monitoring device from a dormant state to an operational state and assigning a tire location to the monitoring device utilizing a hand-held transmitter to remotely activate and assign a tire location to the monitoring unit by actuating at least one switch of a keypad on the hand-held transmitter which corresponds to a particular tire position and subsequently transmitting a signal to the monitoring device;
    periodically sensing a condition within the tire;
    electronically storing sensed tire condition information;
    comparing the sensed tire condition information with preset parameters; and
    periodically telemetering the sensed tire condition information and the monitoring device identification code to a receiver.

2. The process of claim 1, including the steps of immediately telemetering the sensed condition information and the monitoring device identification code to the receiver and activating an alarm if the sensed condition information falls without the preset parameters.

3. The process of claim 1, wherein the unique identification code comprises a multiple bit code.

4. The process of claim 1, wherein the positioning step includes the step of attaching the monitoring device to a rim for the tire.

5. The process of claim 1, wherein the positioning step includes the step of attaching the monitoring device to an inner surface of a tire.

6. The process of claim 1, wherein the sensing step includes the step of measuring tire temperature.

7. The process of claim 1, wherein the sensing step includes the step of measuring tire air pressure.

8. The process of claim 1, wherein the telemetering step includes the step of creating a pulse modulated signal.

9. The process of claim 1, including the step of telemetering the sensed condition information less frequently during periods of vehicle and tire inactivity.

10. The process of claim 1, including the step of communicating from the receiver to a visual display unit the sensed condition information.

11. A process for monitoring a vehicle tire condition, comprising the steps of:
    positioning a dormant tire condition monitoring device having a unique identification code within a pneumatic tire;
    activating and assigning a tire location to the monitoring device by pressurizing each tire containing the monitoring device to a predetermined level to activate the monitoring device from a dormant state to an operational stage and in a predetermined order so as to assign each monitoring device a tire location;
    periodically sensing a condition within the tire, including the step of measuring tire air pressure;
    electronically storing the sensed tire condition information;
    comparing the sensed tire condition information with preset parameters based on previously stored sensed tire condition information;
    periodically telemetering the sensed tire condition information and the monitoring device identification code to a receiver if the sensed condition data falls within the preset parameters; and
    immediately telemetering the sensed tire condition information and the monitoring device identification code to the receiver and activating an alarm if the sensed condition information falls without the preset parameters.

12. The process of claim 11, wherein the unique identification code comprises a multiple bit code.

13. The process of claim 11, wherein the positioning step includes the step of attaching the monitoring device to a rim for the tire.

14. The process of claim 11, wherein the positioning step includes the step of attaching the monitoring device an inner surface of a tire.

15. The process of claim 11, wherein the sensing step includes the step of measuring tire temperature.

16. The process of claim 11, wherein the telemetering step includes the step of creating a pulse modulated signal.

17. The process of claim 11, including the step of telemetering the sensed condition information less frequently during periods of vehicle and tire inactivity.

18. The process of claim 11, including the step of communicating from the receiver to a visual display unit the sensed condition information.

19. A process for monitoring a vehicle tire condition, comprising the steps of:
    positioning a dormant tire condition monitoring device having a multiple bit unique identification code within a pneumatic tire;
    utilizing a hand-held transmitter having a keypad and a plurality of keys including a key for every tire position to activate and assign a tire location to the monitoring device by depressing the keys of the keypad corresponding to tire position and subsequently transmitting a signal to the monitoring device;

periodically sensing a condition within the tire, including the step of measuring tire air pressure;

electronically storing the sensed tire condition information;

comparing the sensed tire condition information with preset parameters based on previously stored sensed tire condition information;

immediately telemetering a pulse modulated signal including the sensed tire condition information and the monitoring device identification code to the receiver and display unit and activating an alarm if the sensed condition information falls without the preset parameters;

periodically telemetering a pulse modulated signal including the sensed tire condition information and the monitoring device identification code to a cab mounted receiver and display unit if the sensed condition data falls within the preset parameters; and telemetering the sensed tire condition information and monitoring device identification code less frequently during periods of low vehicle and tire activity.

20. A tire condition monitoring system, comprising:

a monitoring device positioned within a tire;

a portable wand having a low-frequency radio transmitter and a keypad comprising at least one switch which, when positioned adjacent to the tire, may be activated by actuating at least one switch of the keypad corresponding to tire position to transmit a signal that activates and assigns a tire location to the monitoring device;

a receiver in electronic communication with the monitoring device; and a visual display unit in electronic communication with the receiver;

whereby upon activating the monitoring device with the portable wand, the monitoring device monitors selected conditions within the tire and periodically relays this information to the receiver which information is displayed on the visual display unit.

21. The system of claim 20, wherein the monitoring device includes a battery, at least one sensor in electrical circuit with the battery, a programmable microprocessor in electrical circuit with the battery, a transmitter in circuit with the battery, and an inductive pick-up coil in circuit with the microprocessor.

22. The system of claim 21, wherein the at least one sensor includes a pressure sensor.

23. The system of claim 21, wherein the at least one sensor includes a temperature sensor.

24. The system of claim 21, wherein the transmitter includes a SAW filter capable of generating pulse modulated transmissions.

25. The system of claim 20, wherein the visual display unit is mounted in a cab compartment of the vehicle and includes and audible alarm.

26. A tire condition monitoring system, comprising:

a monitoring device positioned within a tire, the monitoring device having a battery, at least one sensor, including a pressure sensor, in electrical circuit with the battery, a programmable microprocessor in electrical circuit with the battery, a transmitter having a SAW filter capable of generating pulse modulated signal transmissions in circuit with the battery, and an inductive pick-up coil in circuit with the microprocessor;

a portable wand having a keypad and at least one switch, the portable wand, when positioned adjacent to the tire, may be activated by actuating a switch to transmit a signal that activates and assigns a tire location to the monitoring device;

a receiver in electronic communication with the monitoring device; and a cab mounted visual display unit having an alarm and in electronic communication with the receiver;

whereby upon activating the monitoring device with the portable wand, the monitoring device monitors selected conditions within the tire and periodically relays this information to the receiver which information is displayed on the visual display unit.

27. A tire condition monitoring system, comprising:

a monitoring device positioned within a tire, the monitoring device including a battery, an air pressure sensor in circuit with the battery, a transmitter in circuit with the battery and the air pressure sensor, and a motion detector in circuit with the battery;

a receiver in electronic communication with the transmitter; and an alarm in electronic communication with the receiver;

wherein the air pressure sensor comprises a mechanical sensor having a housing including a conductive portion, a pressure sensitive conductive diaphragm positioned within the housing, a first conductive terminal in contact with the battery and the conductive diaphragm, and second conductive terminal in physical contact with the conductive portion of the housing and the transmitter.

28. The system of claim 27, wherein upon activation of the motion detector and decreased ambient air pressure within the tire, the diaphragm expands to physically contact the conductive portion of the housing creating a conductive relationship between the diaphragm and the conductive portion of the housing and thus the second terminal, resulting in electrical power being relayed between the second conductive terminal and the transmitter which generates a signal to the receiver to activate the alarm.

29. The system of claim 27, wherein the monitoring device includes a signal encoder.

30. A process for monitoring tire air pressure, comprising the steps of:

positioning a monitoring device having a mechanical air pressure sensor within a tire, the pressure sensor comprising a housing having a conductive portion, a pressure sensitive conductive diaphragm positioned within the housing, a first conductive terminal in contact with the battery and the conductive diaphragm, and a second conductive terminal in physical contact with the conductive portion of the housing and the transmitter;

determining whether the tire is rotating at a predetermined velocity;

supplying power to the air pressure sensor upon the determination that the tire is rotating at the predetermined velocity;

detecting whether the tire air pressure has dropped below a predetermined level;

transmitting a signal to a receiver outside of the tire once the pressure has dropped below the predetermined level; and activating an alarm upon receipt of the signal by the receiver.

31. The process of claim 30, including the step of generating a vehicle specific signal.

32. The process of claim 30, wherein the determining step includes the step of utilizing the motion detector.

33. The process of claim 30, wherein the supplying step includes the step of switching power from the battery to the first terminal.

34. The process of claim 30, wherein the detecting step includes the step of expanding the diaphragm to physically contact the conductive portion of the housing due to decreased ambient air pressure within the tire, creating a conductive relationship between the diaphragm and the conductive portion of the housing and thus the second terminal, resulting in electrical power being relayed between the second conductive terminal and the transmitter which generates a signal to the receiver to activate the alarm.

* * * * *